(12) United States Patent
Lynch

(10) Patent No.: US 10,835,071 B1
(45) Date of Patent: Nov. 17, 2020

(54) COOKWARE DRAINAGE APPARATUS

(71) Applicant: James B. Lynch, Charleston, SC (US)

(72) Inventor: James B. Lynch, Charleston, SC (US)

( * ) Notice: Subject to any disclaimer, the term of this patent is extended or adjusted under 35 U.S.C. 154(b) by 0 days.

(21) Appl. No.: 16/688,899

(22) Filed: Nov. 19, 2019

(51) Int. Cl.
*A47J 27/00* (2006.01)
*A47J 45/06* (2006.01)

(52) U.S. Cl.
CPC .......... *A47J 27/002* (2013.01); *A47J 45/06* (2013.01)

(58) Field of Classification Search
CPC ........ A47J 27/002; A47J 19/00; A47J 19/005; A47J 43/24; B67C 11/04
See application file for complete search history.

(56) References Cited

U.S. PATENT DOCUMENTS

| | | | |
|---|---|---|---|
| 558,715 A * | 4/1896 | Bradley | B67C 11/04 |
| 584,900 A * | 6/1897 | Scott | B67C 11/04 |
| 1,272,222 A | 7/1918 | Clayton | |
| 4,040,964 A | 8/1977 | Hegyi | |
| 4,604,989 A | 8/1986 | Kita | |
| 4,832,226 A | 5/1989 | Leon | |
| 5,189,946 A | 3/1993 | Leon | |
| 9,771,251 B2 * | 9/2017 | Thomson | B67C 11/04 |
| 2013/0139705 A1 | 6/2013 | Battaglia | |
| 2015/0107680 A1 * | 4/2015 | Chapman, Jr. | F04C 29/126 137/12 |

OTHER PUBLICATIONS

How can I drain the water from a saucepan of pasta without a colander?; Lifehacks Beta; Dec. 22, 2014; https://lifehacks.stackexchange.com/questions/2082/how-can-i-drain-the-water-from-a-saucepan-of-pasta-without-a-colander.
Vasudeva, Brahm; Hawkins Ventura Pressure Cooker Instruction Manual with 21 Tested Recipes; Instruction Manual; 2003; Brahm Vasudeva; Mumbai, India; https://www.hawkinscookers.com/Cookbooks/Ventura%20IM.pdf.

\* cited by examiner

*Primary Examiner* — Benjamin M Kurtz
(74) *Attorney, Agent, or Firm* — Beau B. Horner

(57) ABSTRACT

A cookware apparatus is utilized to efficiently drain liquids from itself. The apparatus includes a body having an upper bottom section including at least one orifice, a lower bottom section, and a sidewall section affixed to the upper bottom section. Shafts affixed to the lower bottom section may be disposed within each of at least one housing mounted to a surface of the sidewall section.

Handle portions affixed to at least one of the body and the at least one housing each include a trigger mechanism for actuating linear movement of the shafts. Actuation of the trigger mechanism separates the lower bottom section from the upper bottom section and the sidewall section to allow liquid to drain through the at least one orifice and out the interior volume of the body.

19 Claims, 12 Drawing Sheets

COOKWARE DRAINAGE APPARATUS

CROSS-REFERENCE TO RELATED APPLICATIONS

N/A

FIELD OF THE INVENTION

The disclosure relates generally to cookware, and more specifically to cooking pots including a drainage portion.

BACKGROUND OF THE INVENTION

Cookware, such as pots and pans, has been an effective means for cooking food for centuries. Many times, and especially for pots, liquids such as water are utilized in order to cook certain foods in the cookware. The cookware provides a convenient retaining means in order to efficiently cook food using a liquid.

When needing to drain cookware, such as in a kitchen or at a football tailgate, a piece of cookware is tipped over so that liquid and food are poured out. This process can be very cumbersome, with unwanted splashing of hot liquids occurring and sometimes needing multiple individuals in order to drain the cookware. Simpler means for draining cookware is needed for individuals to have an easier time to drain cookware.

BRIEF SUMMARY OF THE INVENTION

The disclosed subject matter provides a cookware apparatus for draining liquids. The apparatus comprises a body including an upper bottom section having at least one orifice, a lower bottom section, and a sidewall section affixed to the upper bottom section. At least one housing may be mounted to a surface of the sidewall section. A shaft may be disposed within each of the housings and affixed to the lower bottom section.

A handle portion may be affixed to at least one of the body and the at least one housing. The handle portion may comprise a trigger mechanism for actuating linear movement of the shafts in a direction toward the lower bottom section. Actuation of the trigger mechanism separates the lower bottom section from the sidewall section and upper bottom section in order to allow liquid to drain through the at least one orifice of the upper bottom section and out the interior volume of the body of the apparatus.

BRIEF DESCRIPTION OF THE DRAWINGS

The novel features believed characteristic of the disclosed subject matter will be set forth in any claims that are filed. The disclosed subject matter itself, however, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In embodiments, the cookware of the present disclosure may comprise one or more materials known in the art of cookware. These materials may include, and are not limited to ceramic, clay, polymer, metal, etc.

For the purposes of this disclosure, it is noted that certain characteristics, properties, structures, and functions may be embodied in multiple types of cookware that may include, but is not limited to pots, pans, kettles, etc. It is further noted that the certain characteristics, properties, structures, and functions may be applied to other liquid holding devices such as, but not limited to cups, mugs, pitchers, cartons, jugs, bowls, plates, etc.

Figure 1:
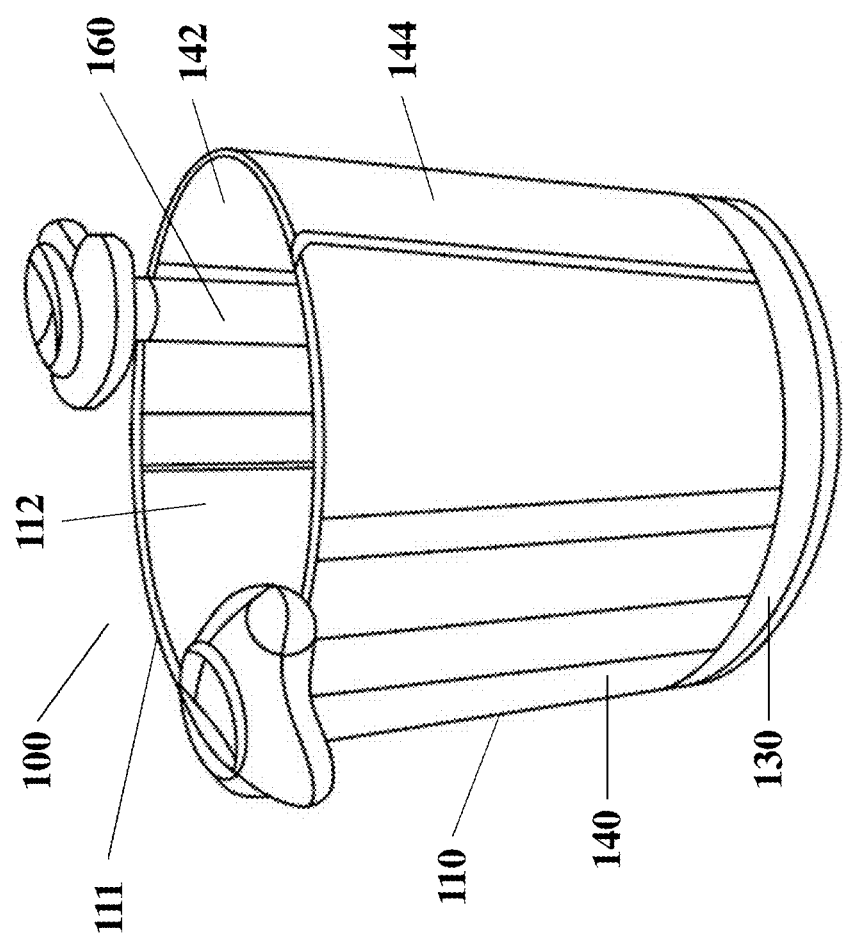
FIG. 1 displays a perspective view of a cookware apparatus in accordance with embodiments.

FIG. 1 displays a perspective view of a cookware apparatus 100 in accordance with embodiments. Cookware apparatus 100 may be in the form of a pot (as shown) and may comprise a body 110 having an upper bottom section 120 (see FIG. 2), a lower bottom section 130, and a sidewall section 140 affixed to the upper bottom section 120. The sidewall section may comprise a rim 111. An interior volume 112 may be bound by upper bottom section 120 and sidewall section 140. Within interior volume 112, a cooking liquid (represented in FIG. 12 as arrows and element 216) and food (not shown) may be temporarily held for cooking purposes. The sidewall section 140 may include an interior surface 142 and an exterior surface 144 that circumnavigates the outer edge of lower bottom section 130. At least one inner housing 160 may be mounted to an interior surface 142 of the sidewall section 140.

In embodiments, the diameter of sidewall section 140 may be substantially the same as the diameter of at least one of lower bottom section 130 so that sidewall section 140 and lower bottom section 130 may be flush with one another.

Figure 2:
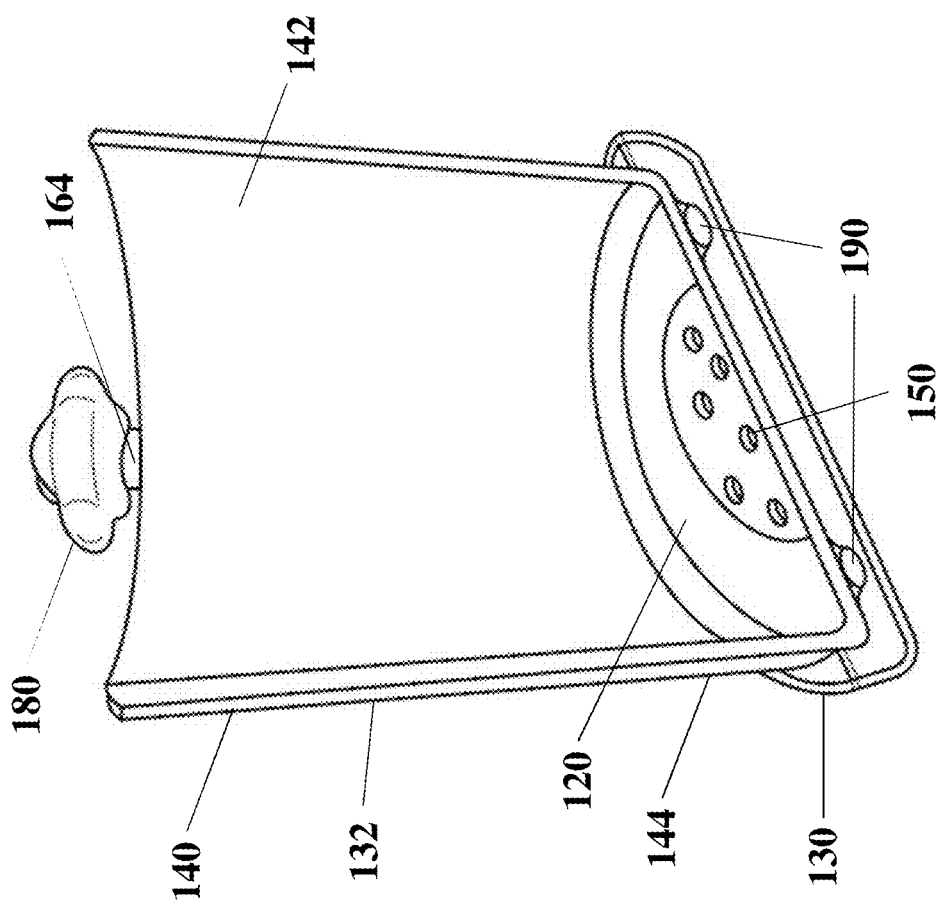
FIG. 2 displays a sectional view of a cookware apparatus in accordance with embodiments.

FIG. 2 displays a sectional view of a cookware apparatus 100 in accordance with embodiments. Body 110 includes an upper bottom section 120 including at least one orifice 150. As shown, sidewall section 140 may be contiguous with a perimeter of upper bottom section 120 to create a container (pot) that is capable of containing cooking liquid 216 and food. When apparatus 100 is in a closed position (upper and lower bottoms sections 120,130 adjacent), upper bottom section 120 engages a seal 190 in order to keep the upper bottom section 120 and lower bottom section 130 water-tight and keep liquid 216 from spilling out of apparatus 100 through the at least one orifice 150.

In embodiments, seal 190 may comprise a polymeric material. In certain embodiments, seal 190 may comprise at least one of rubber, silicone, and silicone rubber.

In embodiments, such as that partially shown in FIG. 2, inner housing 160 may be positioned on exterior surface 144 of sidewall section 140 and may be referred to as outer housing 164 when in this position. It is noted that one or more outer housings 164 may be positioned on exterior surface 144 of sidewall section 140 (see also FIG. 12).

Figure 3:
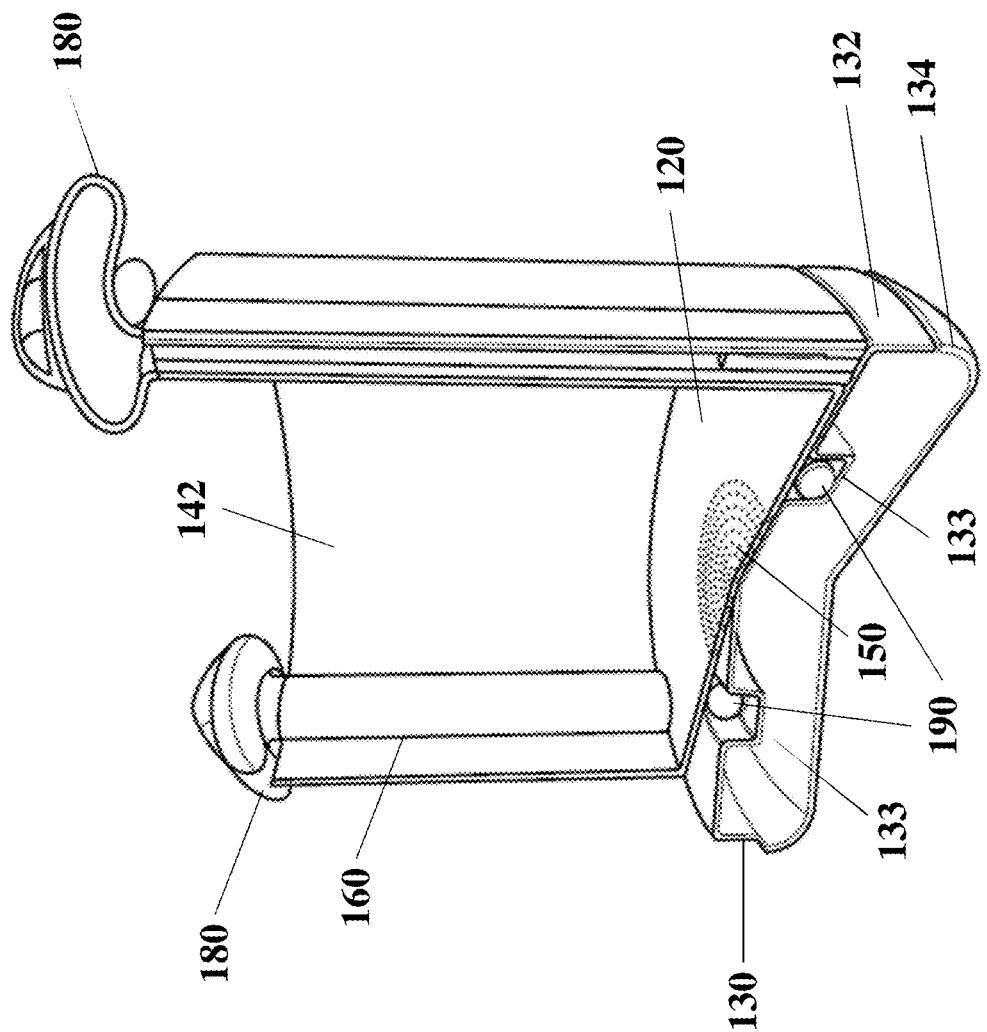
FIG. 3 displays a sectional view of a cookware apparatus in accordance with embodiments.

FIG. 3 displays a sectional view of a cookware apparatus 100 in accordance with embodiments. Inner housings 160 may extend from the top surface of upper bottom section 120 to roughly the top edge of sidewall section 140. Handle portions 180 may sit atop each of the inner housings 160 and may be affixed to at least one of the inner housings 160 and sidewall section 140. Lower bottom section 130 may include top section 132 and bottom section 134. Top section 132 may include a groove 133 in which seal 190 may be positioned. In embodiments, groove 133 may comprise a depth that may allow at least a portion of the seal 190 to sit above the top surface of top section 132 so that upper bottom section 120 contacts seal 190 when apparatus 100 is in a closed position (see FIG. 4, FIG. 6).

In embodiments, groove 133 may comprise a heat resistant and/or insulating material. In certain embodiments, groove 133 may be made of a heat resistant and/or insulating material. In certain embodiments, groove 133 may comprise a heat resistant and/or insulating material coating positioned on at least one of an inside and an outside surface of groove 133. In certain embodiments, groove 133 may be made of a heat resistant and/or insulating material and may comprise a heat resistant and/or insulating material coating positioned on at least one of an inside and an outside surface of groove 133. The addition of the heat resistant and/or insulating material or coating may provide shielding of seal 190 in case seal 190 is sensitive to the heat that apparatus 100 is exposed to.

Figure 4:
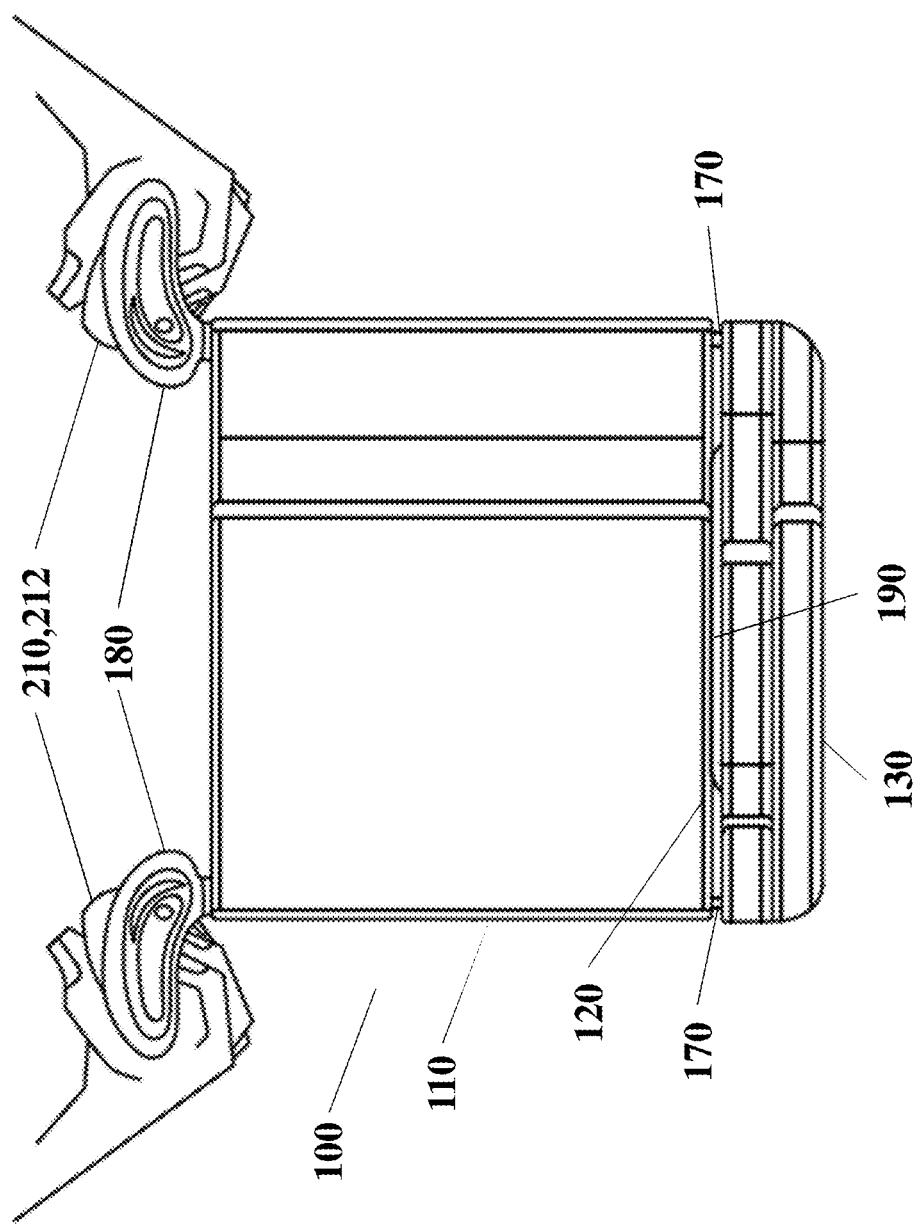
FIG. 4 displays a partial sectional view of a cookware apparatus in a closed position in accordance with embodiments.

FIG. 4 displays a partial sectional view of a cookware apparatus 100 in a closed position in accordance with embodiments. Handle portions 180 may each include a trigger mechanism 210 for actuating linear movement of shafts 170 that are housed within the inner housings 160 and affixed to the trigger mechanisms 210 and the lower bottom section 130. Trigger mechanisms 210, including push-button mechanisms 212 in embodiments, are actuated upon by an outside force from an individual's fingers/hands.

Figure 5:
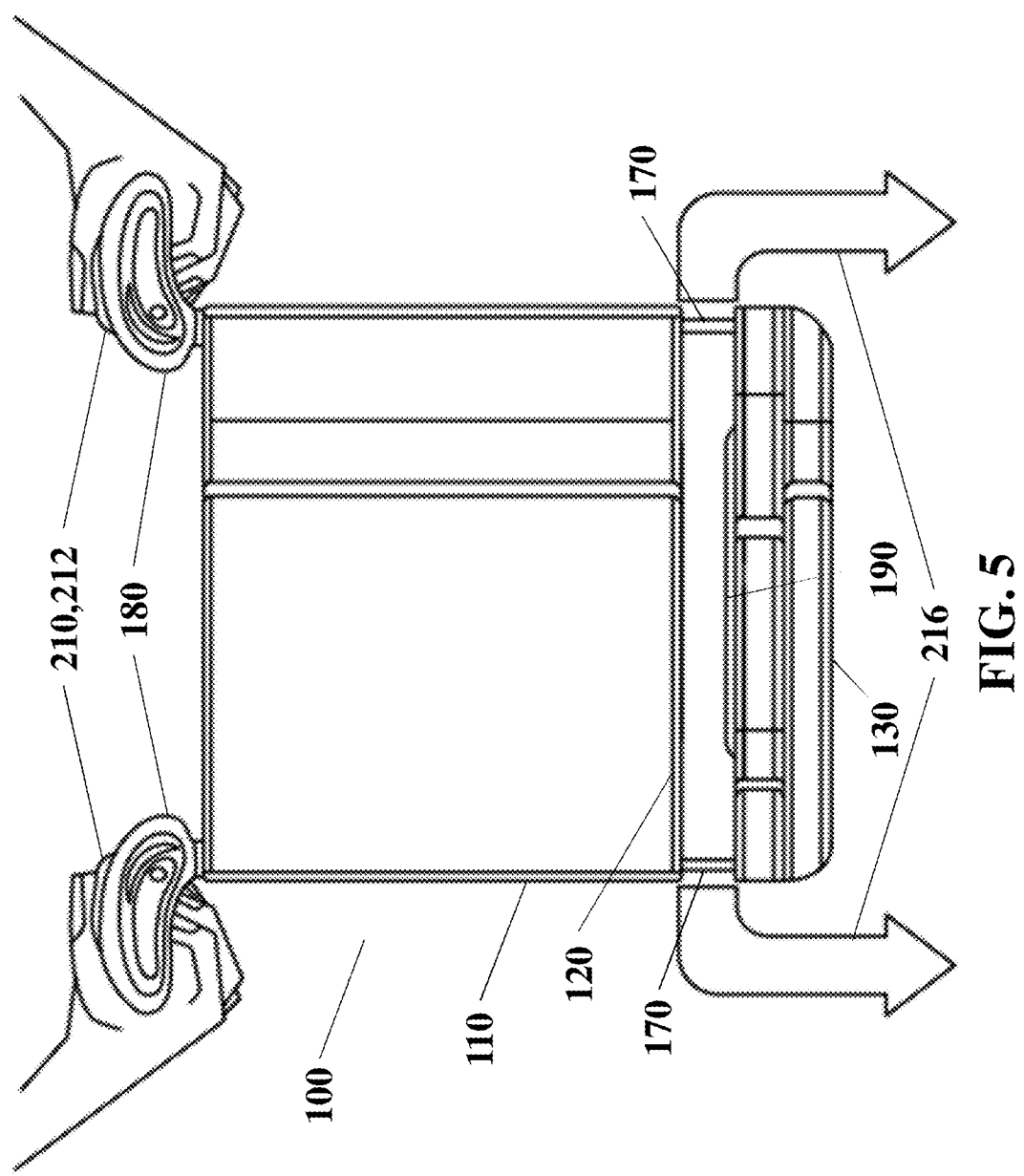
FIG. 5 displays a partial sectional view of a cookware apparatus in an open position in accordance with embodiments.

When the actuation occurs, as shown in FIG. 5, push-button mechanisms 212 are pressed in a downward direction and shafts 170 are sent in a downward direction toward lower bottom section 130, forcing the lower bottom section 130 to separate from upper bottom section 120 and sidewall section 140 and creating an opening between the lower bottom section 130 and the rest of apparatus 100. It is through this opening that liquid 216, represented as arrows, may drain through the at least one orifice 150 and out the interior volume 112 of the body 110 so that separation of food from the liquid 216 may occur without the need to turn apparatus 100 to one side to pour out liquid 216 or the need of a strainer. This configuration may allow a user to more easily separate cooked food from cooking liquid 216.

In embodiments, when inner housings 160 are positioned on exterior surface 144 of sidewall section 140 (FIG. 2), lower bottom section 130 may comprise a diameter substantially larger than that of upper bottom section 120 and sidewall section 140 so that shafts 170 have a surface to connect and apparatus 100 can function properly (as described above).

It is noted that when inner housings 160 are positioned on interior surface 142 of sidewall section 140, shafts 170 may either pass through upper bottom section 120 via orifices or upper bottom section 120 may be die cut so that upper bottom section 120 does not exist within/below inner housings 160.

Figure 6:
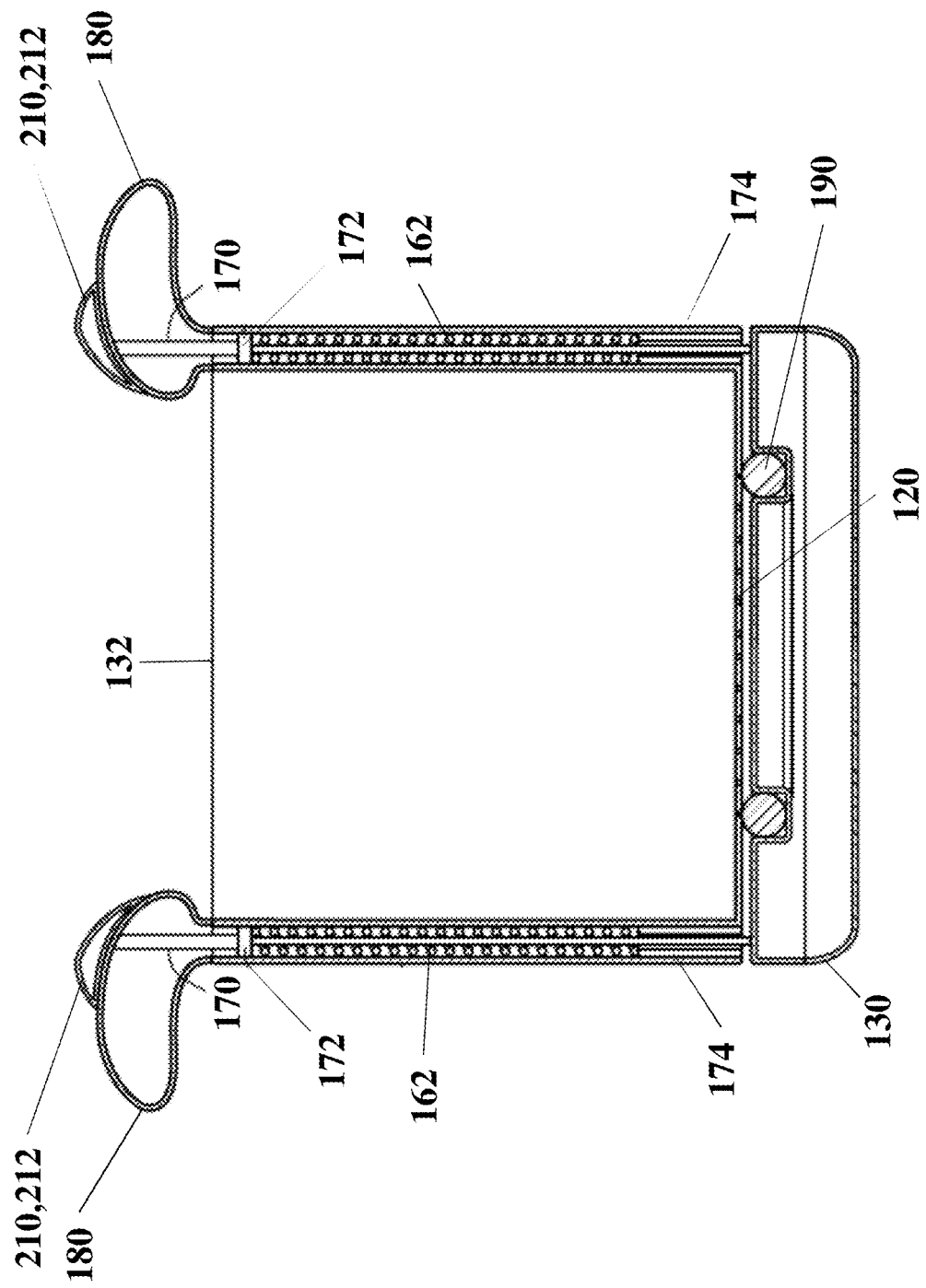
FIG. 6 displays a sectional view of a cookware apparatus including a trigger mechanism in accordance with embodiments.

FIG. 6 displays a sectional view of a cookware apparatus 100 including a trigger mechanism 210 in accordance with embodiments. Upper portions of the shafts 170 may be housed within and extend through handle portions 180 and affix to the trigger mechanisms 210 found at the tops of the handle portions 180. As the trigger mechanisms 210 are activated (push-button mechanisms 212 being pressed in a downward direction), as shown in FIG. 7, shafts 170 are forced in a linear downward direction through the inner housings 160, resulting in the separation of the lower bottom section 130 from the rest of apparatus 100.

Figure 7:
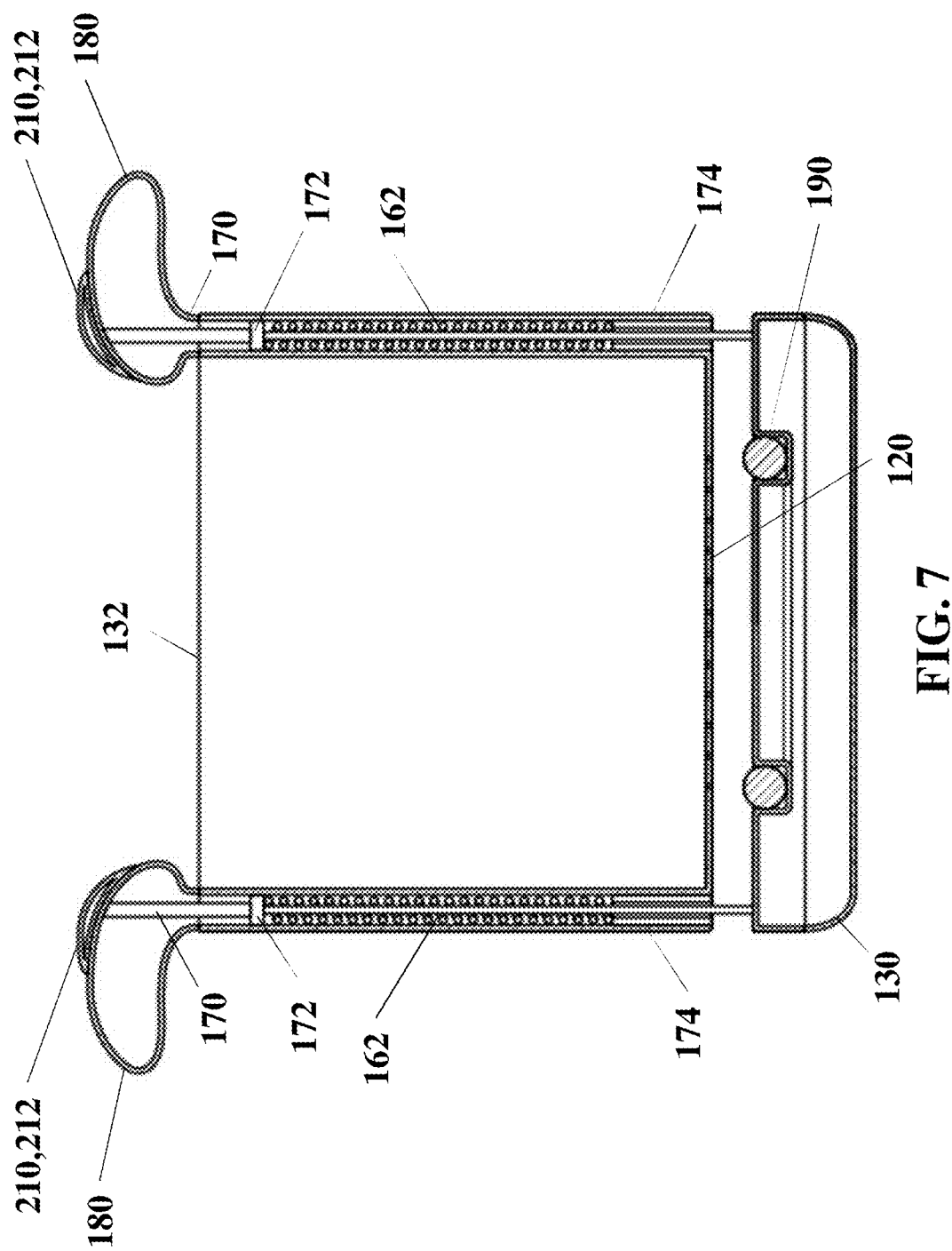
FIG. 7 displays a sectional view of a cookware apparatus including an engaged trigger mechanism in accordance with embodiments.

In order to create a smooth path for the shafts 170 to travel, a resilient device 162 is positioned within each inner housing 160, as shown in FIGS. 6 and 7. Resilient device 162 may be enclosed within inner housing 160 by a stopper portion 172 affixed to shaft 170 and a housing lower portion 174. When a push-button mechanism 212 is engaged and pushed downward, stopper portion 172 is forced against resilient device 162, providing a smooth path for shaft 170 to travel (as opposed to having the shafts 170 fall freely without resistance and potentially creating a jarring of the lower bottom section 130. Housing lower portion 174 assists in keeping resilient device 162 housed within inner housing 160 and additionally provides force to decompress resilient device 162 and help force shaft 170 upward to put push-button mechanism 212 back in an engageable position.

Figure 8:
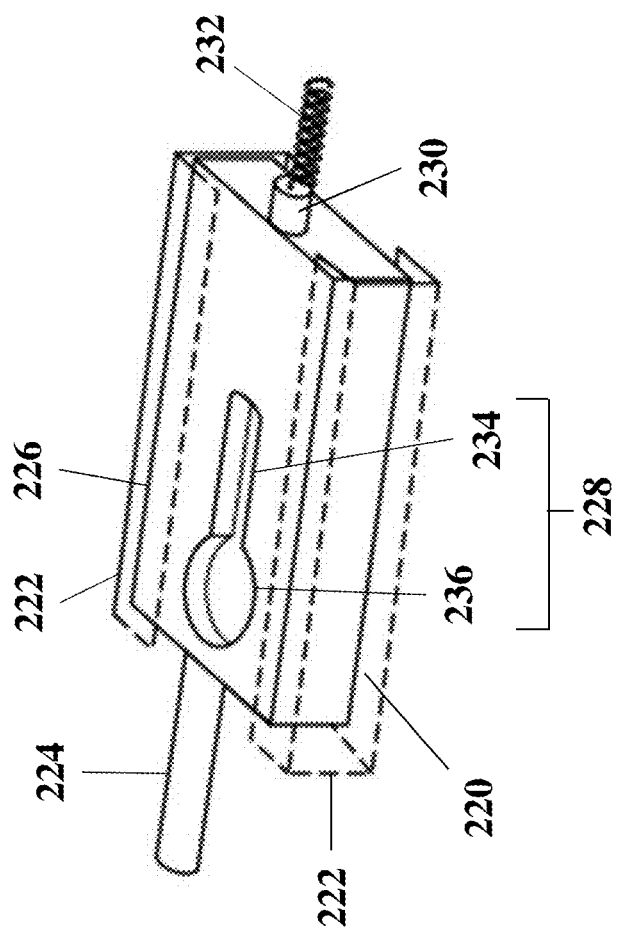
FIG. 8 displays a perspective view of an impediment mechanism in accordance with embodiments.
Figure 9:
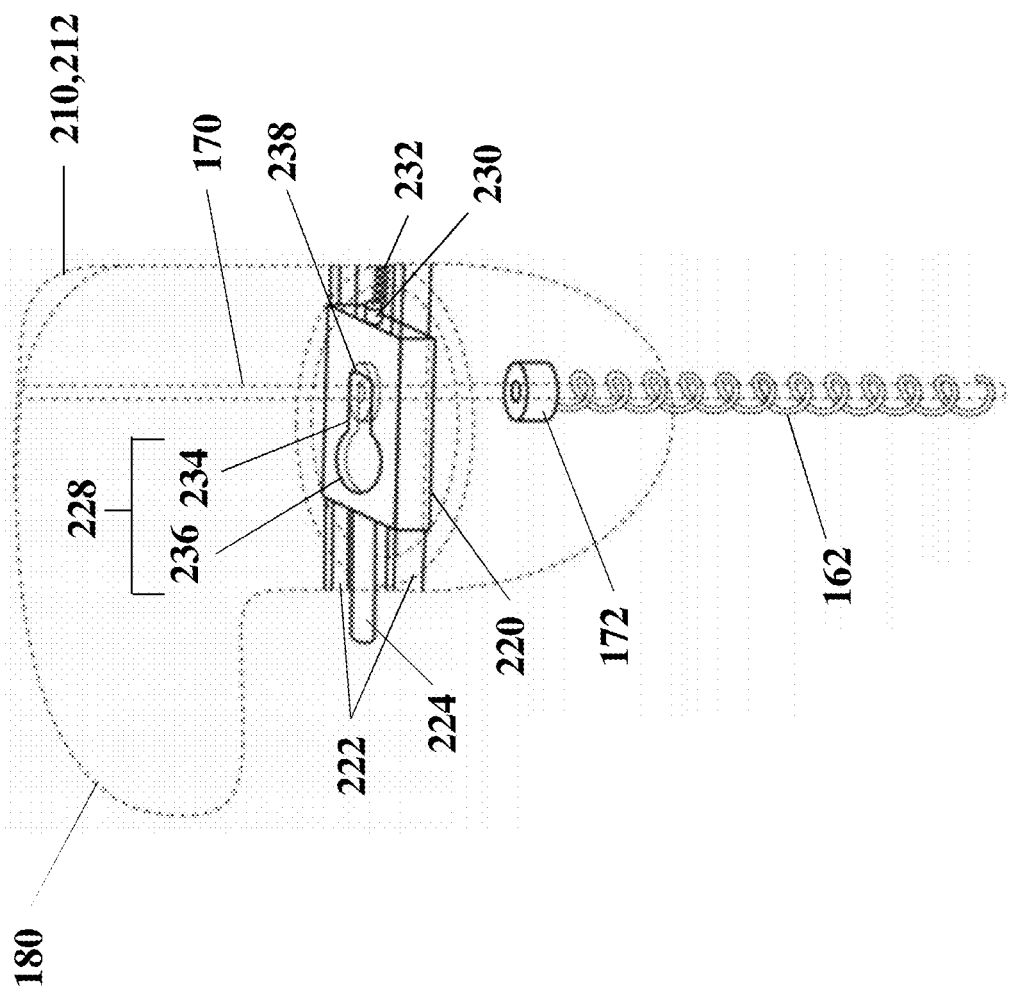
FIG. 9 displays a partial view of a portion of a cookware apparatus including an impediment mechanism in a first position accordance with embodiments.

FIG. 9 displays a partial view of a portion of a cookware apparatus 100 including an impediment mechanism 220 in a first position (closed position) in accordance with embodiments. Impediment mechanism 220 may be positioned between a track portion 222 to restrict vertical movement of impediment mechanism 220. Impediment mechanism 220, as shown in FIG. 8, comprises a button portion 224, a central body portion 226 having an orifice track 228, and a receiver portion 230 for receiving a lateral resilient device 232 (in this case, a spring). Lateral resilient device 232 may be affixed to an inner wall portion of handle portion 180 and may apply a lateral force to receiver portion 230 and impediment mechanism 220. This force may push impediment mechanism 220 against an opposite portion of the inner wall of the handle portion 180 while also allowing button portion 224 to extend through and out of an orifice in the wall of handle portion 180 (a first closed position).

In embodiments, impediment mechanism 220 may not include receiver portion 230. In other embodiments, lateral resilient device 232 may be at least one of partially embedded within impediment mechanism 220 and affixed to impediment mechanism 220.

In embodiments, receiver portion 230 may be indented to allow for lateral resilient device 232 to be positioned snugly against receiver portion. In other embodiments, lateral resilient device 232 may be at least one of partially embedded within lateral resilient device 232 and affixed to lateral resilient device 232.

Orifice track 228 may include a thin orifice section 234 and a wide orifice section 236 conjoined to one another. Each shaft 170 includes flange 238 that may be less than or equal to the width of wide orifice section 236 and greater than the width of thin orifice section 234, while each shaft 170 may be less than or equal to the width of thin orifice section 234.

Figure 10:
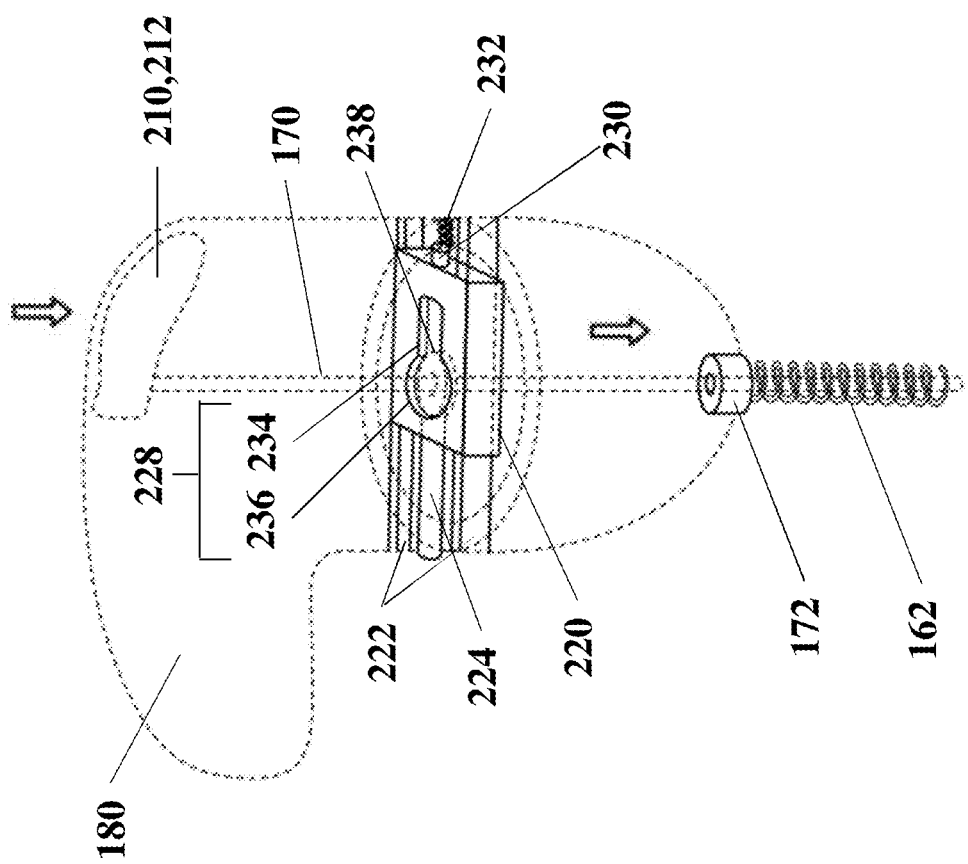
FIG. 10 displays a partial view of a portion of a cookware apparatus including an impediment mechanism in a second position accordance with embodiments.

Flange 238 may be positioned above impediment mechanism 220 so that it resides above thin orifice section 234 when impediment mechanism 220 is in the closed position. When button portion 224 is pressed inward toward apparatus 100, impediment mechanism 220 is shifted laterally toward lateral resilient device 232, compressing lateral resilient device 232 in the process. At the same time, thin orifice section 234 and wide orifice section 236 are also shifted toward lateral resilient device 232 and in the process, flange 238 and wide orifice section 236 align so that flange 238 may pass downward through wide orifice section 236 to a second position (below impediment mechanism 220) when trigger mechanism 210 is actuated (see arrow), as shown in FIG. 10 (and thus allowing shaft 170 to move in a downward direction, denoted with an arrow, to separate lower bottom section 130 from the rest of apparatus 100 [apparatus 100 in an open position]). Once flange 238 passes downward through wide orifice section 236 to a second position (below impediment mechanism 220), button portion 224 is disengaged and impediment mechanism 220 is forced into a second closed position by lateral resilient device 232.

To put apparatus 100 back in its first closed position, trigger mechanisms 210 may be disengaged and button portion 224 may be reengaged so that flange 238 and wide orifice section 236 align and flange 238 is forced upward through wide orifice section 236, impediment mechanism 220 is forced back into its first closed position by lateral resilient device 232, and flange 238 comes to rest in its initial position.

It is noted that impediment mechanisms 220 are positioned underneath a gripping section (by an individual) of handle portions 180. In embodiments, impediment mechanisms 220 may be positioned at an angle in relation to the impediment mechanisms 220 shown in FIG. 8. For example, impediment mechanisms 220 may be positioned at a 90-degree angle in relation to the impediment mechanism 220 found in FIGS. 9 and 10 so that button portions 224 may be engaged laterally as opposed to inward toward apparatus 100.

In embodiments, impediment mechanism 220 may be positioned within inner housing 160. In this embodiment, impediment mechanism 220 and any associated characteristics of impediment mechanism 220 may be utilized in a setup that would be positioned below the setup of impediment mechanism 220 found in FIGS. 9 and 10.

Figure 11:
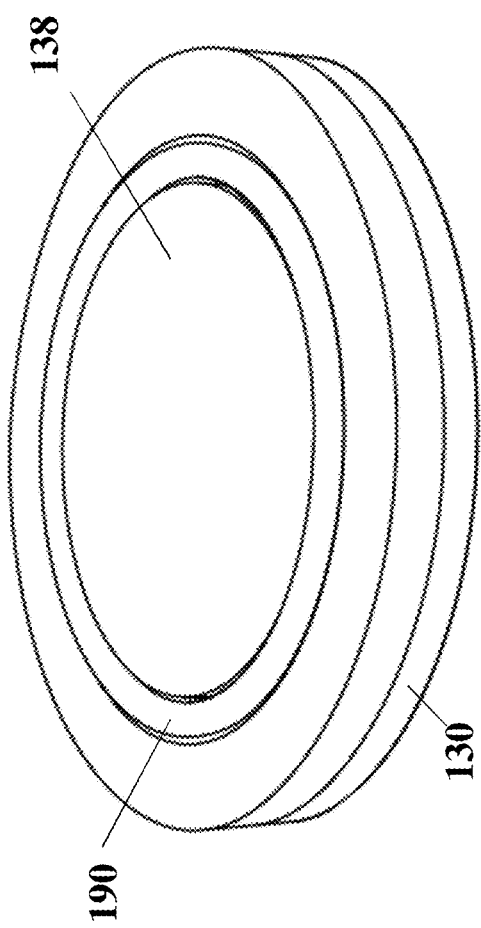
FIG. 11 displays a top angle view of a lower bottom section of a cookware apparatus including a liquid landing surface in accordance with embodiments.

FIG. 11 displays a top angle view of a lower bottom section 130 of a cookware apparatus 100 including a liquid landing surface 138 in accordance with embodiments. Liquid landing surface 138 may be positioned on the upper surface 136 of lower bottom section 130. Surface 138 may comprise at least one of a rubber and an elastomer for reduction of splashing when liquid 216 contacts the liquid landing surface 138. In embodiments, seal 190, positioned at least partially in lower bottom section 130, may be positioned so that seal 190 circumnavigates the liquid landing portion 138. In embodiments, the rubber or elastomer may comprise a shore A value of less than 80 so that a reduction of splashing of liquid 216 may occur when liquid 216 exits apparatus out of orifices 150 and falls/spills onto liquid landing portion 138.

In embodiments, liquid landing surface 138 may be a singular piece that may be placed within lower bottom section 130. The singular piece may be affixed to lower bottom section 130 via an adhesive, locking mechanism, etc.

Figure 12:
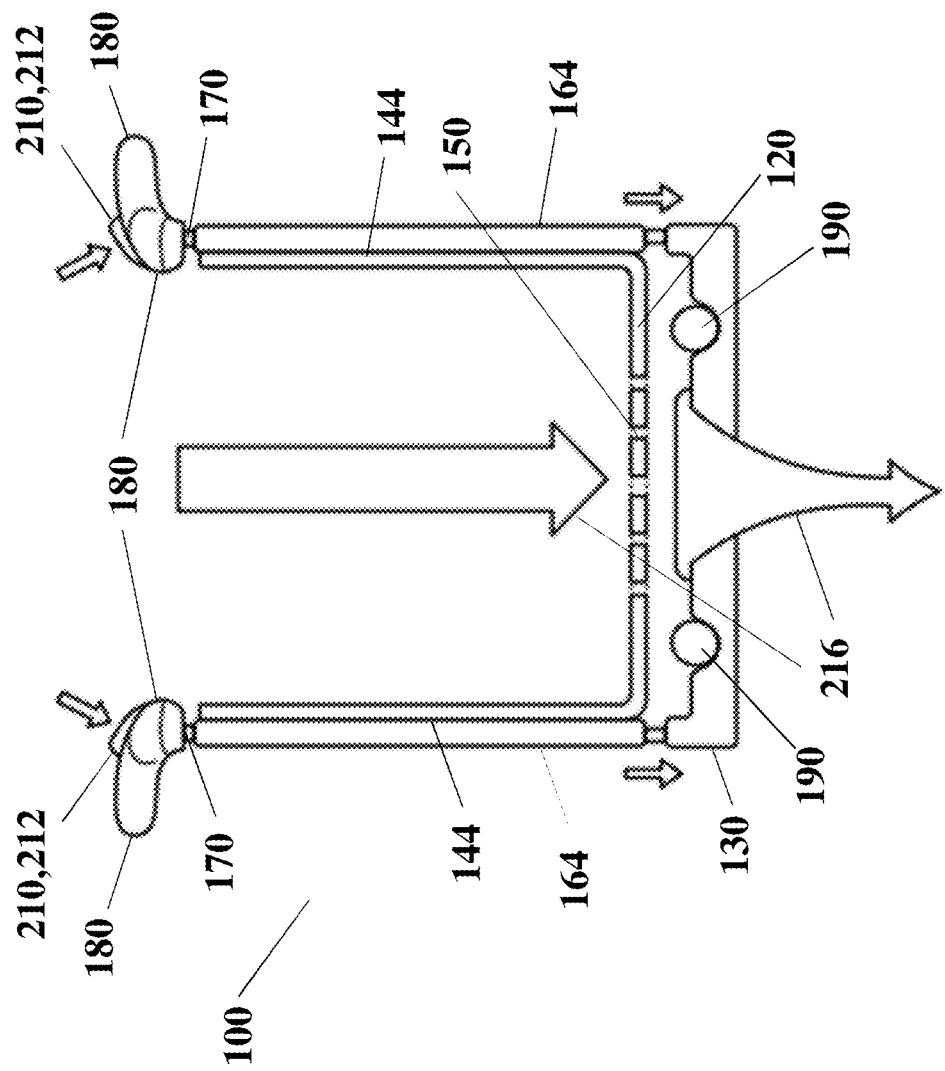
FIG. 12 displays a sectional view of a cookware apparatus including a directional water flow in accordance with embodiments.

FIG. 12 displays a sectional view of a cookware apparatus 100 including a directional water flow in accordance with embodiments. It is noted that when apparatus 100 is in the open position, liquid 216 may flow from within interior volume 112 and out orifices 150, land onto liquid landing surface 138, and flow/spill out over the edge of lower bottom section 130. This process may occur when trigger mechanism 210 is engaged (in this case, pressed downward) and lower bottom section 130 is separated from the rest of apparatus 100.

In embodiments, such as that found in FIG. 12, apparatus 100 may comprise at least one outer housing 164 affixed to exterior surface 144 that each house shaft 170 and other components (can house similar or same components as inner housing 160).

It is noted that apparatus 100 may be referred to as being in a "closed position" when lower bottom section 130 is adjacent upper bottom section 120. Apparatus 100 may be referred to as being in an "open position" when lower bottom section 130 is not adjacent upper bottom section 120 (when lower bottom section 130 is pushed away from upper bottom section 120 and sidewall section 140 via one or more shafts 170).

In embodiments, body 110 may comprise stainless steel. In other embodiments, body 110 may comprise materials such as, but not limited to, metal, ceramic, plastic, and wood.

In embodiments, inner housing 160 may extend above rim 111 of sidewall section 140 to connect with handle portion 180.

In embodiments, at least one of resilient device 162 and lateral resilient device 232 may comprise a spring.

For the purposes of this disclosure, the terms cookware and cookware apparatus 100 may be synonymous.

For the purposes of this disclosure, the term housing may refer to either inner housing 160 or outer housing 164.

For the purposes of this disclosure, the terms liquid 216 and cooking liquid 216 may be synonymous.

For the purposes of this disclosure, the terms trigger mechanism 210, push-button mechanism 212 and button mechanism may be synonymous.

LIST OF PARTS cookware apparatus/apparatus 100
body 110 rim 111
interior volume 112
upper bottom section 120
lower bottom section 130
top section 132
groove 133
bottom section 134
upper surface 136
liquid landing surface 138
sidewall section 140
interior surface 142
exterior surface 144
orifice 150
inner housing 160
resilient device 162
outer housing 164
shaft 170
stopper portion 172
housing lower portion 174
handle portion 180
seal 190
trigger mechanism 210
push-button mechanism 212
liquid/cooking liquid 216
impediment mechanism 220
track portion 222
button portion 224
central body portion 226
orifice track 228
receiver portion 230
lateral resilient device 232
thin orifice section 234
wide orifice section 236
flange 238

Unless otherwise defined, all technical and scientific terms used herein have the same meanings as are commonly understood by one of ordinary skill in the art to which this disclosure belongs. Although methods similar or equivalent to those described herein can be used in the practice or testing of the present disclosure, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present disclosure is not limited to what has been particularly shown and described hereinabove. Rather, the scope of the present disclosure is defined by the appended claims and includes both combinations and sub-combinations of the various features described hereinabove as well as variations and modifications thereof, which would occur to persons skilled in the art upon reading the foregoing description.

The invention claimed is:

1. A cookware apparatus for draining liquids, comprising:
a body comprising an upper bottom section, a lower bottom section adjacent the upper bottom section, and a sidewall section affixed to the upper bottom section, the upper bottom section comprising at least one orifice;
a plurality of housings mounted to a surface of the sidewall section;
a plurality of shafts, a respective one of each of the plurality of shafts disposed within a respective one of each of the plurality of housings, the plurality of shafts affixed to the lower bottom section; and
a plurality of handle portions, each of the plurality of handle portions affixed to at least one of the body and a respective one of each of the plurality of housings, each of the plurality of handle portions comprising a trigger mechanism for actuating linear movement of a respective one of the plurality of shafts;
wherein actuation of the trigger mechanisms separate the lower bottom section from the upper bottom section and the sidewall section to allow liquid to drain through the at least one orifice and out an interior volume of the body.

2. The apparatus of claim 1, wherein the body comprises stainless steel.

3. The apparatus of claim 1, wherein an exterior surface of the sidewall section comprises a smooth surface.

4. The apparatus of claim 1, wherein the sidewall section is contiguous with a perimeter of the upper bottom section.

5. The apparatus of claim 1, further comprising a liquid landing surface positioned on an upper surface of the lower bottom section.

6. The apparatus of claim 5, wherein the liquid landing surface comprises at least one of a rubber and an elastomer for reduction of splashing when the liquid contacts the liquid landing surface.

7. The apparatus of claim 6, wherein the at least one of a rubber and an elastomer comprises a shore A value of less than 80.

8. The apparatus of claim 1, further comprising a seal positioned at least partially within the lower bottom section.

9. The apparatus of claim 8, wherein the seal comprises a polymeric material.

10. The apparatus of claim 8, wherein the upper bottom section engages the seal when the cookware apparatus is in a closed position.

11. The apparatus of claim 10, wherein the upper bottom section and the lower bottom section are in a water-tight state when the cookware apparatus is in the closed position.

12. The apparatus of claim 10, wherein the upper bottom section is disengaged from the seal when the cookware apparatus is in an open position.

13. The apparatus of claim 1, wherein the lower bottom section comprises a top section and a bottom section, wherein the top section comprises a groove comprising a seal positioned in the groove.

14. The apparatus of claim 1, wherein actuation of the trigger mechanisms actuate linear movement of the plurality of shafts.

15. The apparatus of claim 1, further comprising a plurality of resilient devices, each of the plurality of resilient devices positioned within a respective one of each of the plurality of housings.

16. The apparatus of claim 15, further comprising a plurality of stopper portions and a plurality of housing lower portions, wherein each of the plurality of stopper portions are affixed to a respective one of each of the plurality of shafts, further wherein each of the plurality of resilient devices are bound by a respective one of each of the plurality of stopper portions and each of the plurality of housing lower portions.

17. The apparatus of claim 1, wherein each of the plurality of shafts comprise a flange portion.

18. The apparatus of claim 17, wherein each of the plurality of handle portions comprise an impediment mechanism for impeding linear movement of a respective one of the flange portions when the plurality of shafts are actuated.

19. The apparatus of claim 18, wherein a respective one of the impediment mechanisms restricts the linear movement of a respective one of the plurality of shafts when a respective one of the impediment mechanisms is in a first position and allows for linear movement of the respective one of the plurality of shafts when the respective one of the impediment mechanisms is in a second position.

\* \* \* \* \*